Figure 1:
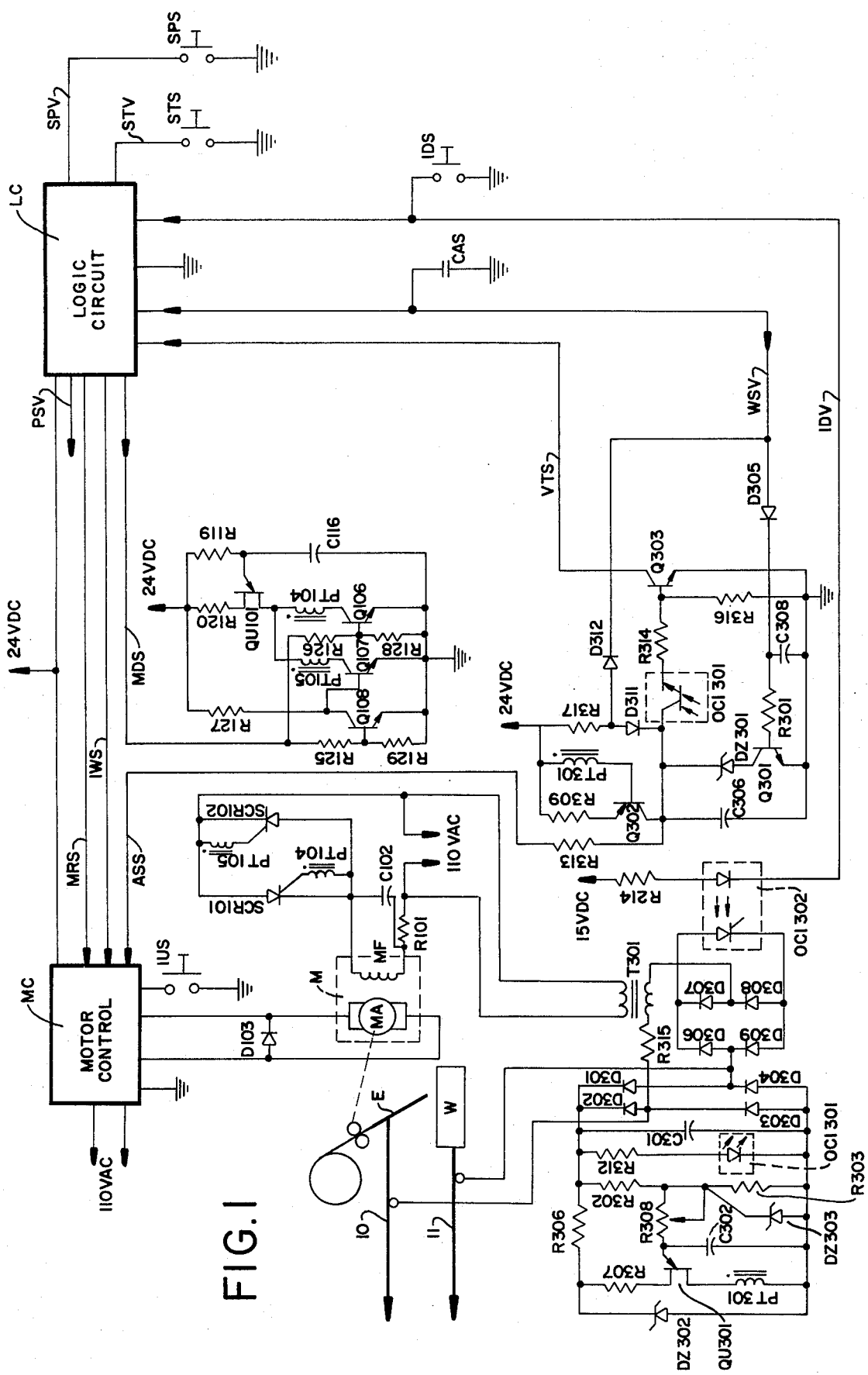

United States Patent [19]
Siktberg et al.

[11] 3,975,616
[45] Aug. 17, 1976

[54] CONTROL CIRCUIT FOR AUTOMATIC ELECTRIC ARC-WELDER

[75] Inventors: Richard Philip Siktberg, Richmond Heights; Marvin Lee Schiedermayer, Euclid, both of Ohio

[73] Assignee: The Lincoln Electric Company, Cleveland, Ohio

[22] Filed: Nov. 13, 1974

[21] Appl. No.: 523,462

[52] U.S. Cl. ............ 219/131 F; 219/131 R; 318/258
[51] Int. Cl.² ............................. B23K 9/12
[58] Field of Search ............. 219/131 F, 135; 318/258, 261, 296, 300

[56] References Cited
UNITED STATES PATENTS

| | | | |
|---|---|---|---|
| 2,468,570 | 4/1949 | Nyburg | 219/135 |
| 2,752,469 | 6/1956 | Price | 219/131 F |
| 2,759,120 | 8/1956 | Cornell, Jr. | 219/135 |
| 2,832,000 | 4/1958 | Steele | 219/131 F |
| 3,141,085 | 7/1964 | Manz | 219/131 F |
| 3,369,146 | 2/1968 | Adamson | 219/131 F |
| 3,611,093 | 10/1971 | Walker | 318/258 |
| 3,684,937 | 8/1972 | Reeves et al. | 318/261 |

Primary Examiner—J. V. Truhe
Assistant Examiner—Clifford C. Shaw
Attorney, Agent, or Firm—Meyer, Tilberry & Body

[57] ABSTRACT

An electrode feed motor control circuit for an automatic electric arc welder which gives improved starting. For cold starts, the electrode feed motor is instantaneously braked when the electrode first contacts the workpiece so that the electrode is lightly touching the workpiece and the electrode motor field is energized for pull back preparatory to the weld start. For hot and cold starts, the motor speed more rapidly responds to transitional meltoff requirements. The motor speed is automatically limited until the arc is fully established.

5 Claims, 1 Drawing Figure

CONTROL CIRCUIT FOR AUTOMATIC ELECTRIC ARC-WELDER

This invention pertains to the art of electric arc welding and more particularly to a control circuit for the electrode feed motor of an automatic electric arc welder.

The invention is particularly applicable to electric arc welding using variable voltage welding, that is to say a power source with a dropping volt-ampere curve and will be described with particular reference thereto although it will be appreciated that the invention has other applications and may in some instances be used with constant potential welding.

The common practice for automatic variable voltage welding is to bring the electrode to rest in contact with the workpiece as a preparatory step before starting the weld.

To arrive at this state, an electro-mechanical sequence is set in motion which will permit the electrode to advance until it touches the workpiece and makes electrical contact therewith. The electrode is stopped before it exerts undue pressure on the workpiece. This standby condition remains unchanged until a start button is pushed to energize the electrode. The arc is established and the electrode feed motor starts to feed the electrode toward the workpiece. This is known as a cold start.

A second mode of starting the weld is where the electrode, fully energized by the power source, advances toward the workpiece, touches the work and establishes the welding arc. This is known as a hot start.

The rate at which the electrode advances toward the workpiece during the welding period is predetermined by the operator. Under the constant potential mode of welding, the electrode advances at a constant rate while under variable voltage modes, the speed of the electrode will vary as the arc voltage varies. The welding must be done in one mode or the other.

One of the most critical points of the weld cycle is the starting of the arc. This is a transient period when the meltoff rate of the electrode is going from 0 inches per minute to its predetermined meltoff rate.

Although not a part of this invention, the arc is more readily started if the energized electrode is backed away from its initial contact with the workpiece to initiate the arc before it is then advanced toward the workpiece at its predetermined rate for welding. This takes advantage of the transient period in the meltoff rate to establish the arc.

What constitutes the invention is the electro mechanical means to control the electrode feed during this transient period in such a way that the direction of travel and the rate of electrode feed closely approximates the transitional meltoff requirements during the starting period.

The invention is a unique solid state circuit for providing the above results. The invention applies to the circuitry which controls the wire drive motor. Peripheral circuitry which contributes to the whole of the operation but not a part of the invention is well known and not a part of the invention such as the use of logic circuitry to provide switching in reference to electrical signals resulting from a chain of events.

In accordance with the invention, the electrode feed motor is of the shunt connected type in combination with means for selectively energizing the armature with a unidirectional polarity means for selectively energizing the field with a reversible polarity, and means are provided for automatically dynamically braking the armature when it is de-energized and the field polarity is reversed. Additionally, for cold starts means provide a low voltage sensing signal between the electrode and workpiece; and means are provided for simultaneously de-energizing the motor armature and reversing the motor field polarity the instant that the electrode first contacts the workpiece and shorts out the sensing voltage whereby to provide dynamic braking of the electrode feed motor so that the electrode end is lightly touching the workpiece so that when the electrode and motor armature are energized, the electrode will initially be withdrawn from the workpiece to start the arc.

For hot start variable voltage welding, means are provided after the weld start button is actuated for limiting the motor speed before the electrode touches the workpiece and other means are provided for limiting the motor speed or ever momentarily reversing the motor after the electrode touches the workpiece and before the arc is stabilized.

The principle object of the invention is the provision of a new and improved control for the electrode drive motor of an automatic electric arc welder which gives improved cold and hot starts, particularly when a variable voltage power source is employed.

Another object of the invention is the provision of a new and improved control circuit for the electrode feed motor which, when the electrode is being inched down, dynamically brakes the electrode feed motor to a stop when the electrode first contacts the workpiece so that the electrode will only lightly engage the workpiece.

Another object of the invention is the provision of a new and improved control for an electrode feed motor wherein the speed of the feed motor is proportional to the electrode-workpiece voltage, and separate automatically switched means are provided for: limiting the electrode feed motor speed after the start weld switch is actuated but before the arc is struck; and for limiting the speed after the electrode touches the workpiece and before the arc is stabilized.

The invention may take physical form in certain parts and arrangements of parts a preferred embodiment of which will be described in detail in this specification and illustrated in the accompanying drawings which form a part hereof and wherein:

FIG. 1 is a schematic diagram of a preferred embodiment of the control circuit, certain portions which form no part of the present invention which are relatively conventional and which are shown in the form of a function block.

Referring now to the drawings wherein the showings are for the purposes of illustrating a preferred embodiment of the invention only and not for the purposes of limiting same, the FIGURE shows a welding electrode E and a workpiece W connecting to a power source (not shown), an electrode feed motor M, a motor control circuit MC, a logic control circuit LC, an inch down switch IDS, a start switch STS, a stop switch SPS, an inch up switch IUS and the various energizing and control circuits for the motor.

The motor M includes an armature MA and a field MF which are relatively conventional in construction and forms no part of the present invention.

MOTOR CONTROL CIRCUIT

The motor control circuit MC is also conventional and will not be described herein in detail except to indicate that the circuit contains electrical components responsive to a motor run signal MRS which when on, energizes the motor armature MA. The motor control circuit MC also includes components responsive to an arc sensing signal ASS for varying the voltage applied to the motor armature in an amount directly proportional to the arc voltage. The circuit MC also includes components responsive to an inch weld signal IWS for shifting from a predetermined slow electrode advance to the arc voltage responsive speed. The motor control circuit MC also importantly contains a free wheeling diode D103 in parallel with the armature winding MA which is used for dynamic braking and SCR turnoff.

LOGIC CIRCUIT

The logic circuit LC is relatively conventional and with the functions it is to perform is readily constructed by those skilled in the art and will not be described in detail herein. The logic circuit shown has the following input signals or voltages.

Inch down signal IDV
Weld start signal STV
Weld stop signal SPV
Voltage threshold signal VTS
Weld voltage signal WSV The logic circuit has the following output signals.

Motor run signal MRS
Motor direction signal MDS
Power source on signal PSV
Inch-weld signal IWS

MOTOR FIELD POWER SUPPLY

The motor field MF is energized from an 110 V AC source through resistor R101 and a half wave power supply consisting of reversely connected silicon controlled rectifiers SCR101, SCR102 and the output filtered by capacitor C102. The polarity of the motor field MF is determined by which SCR is on. These SCR's are fired by PT104 and PT105 which pulse transformers receive pulses of voltage produced by unijunction transistor QU101 connected in a unijunction transistor oscillator circuit oscillating at a relatively high frequency as determined by capacitor C116 and resistors R119 and R120. This relatively high frequency is necessary in order to turn on SCR101 or 102 as early in each half cycle as possible. Transistors Q106 and Q107 are connected in series with the primaries of pulse transformers PT104 and 105 respectively for the purpose of turning them on and off. One of these transistors is always on but they are never both on or both off at the same time. The motor direction signal MDS is normally low. Thus, in the initial condition of the circuit as shown, transistors Q108 and Q106 are off and Q107 is on. Pulse transformer PT105 is thus energized and SCR102 is being fired. This produces polarity at the terminals of the motor field MF such that the direction of motor rotation, when the armature MA is energized, is to retract the electrode E away from the workpiece W. When the motor direction signal MDS is on, transistors Q108 and 106 are turned on and Q107 is turned off due to Q108 shorting the base of Q107 to ground potential. Thus, pulse transformer PT104 is energized and SCR101 is fired. This reverses the polarity of motor field MF and hence reverses the direction of rotation of the motor armature MA, if the motor armature MA is energized, so that the motor will then feed the electrode E downwardly towards the workpiece. It will be noted that this circuit provides a very rapid reversal of the direction of the rotation of the motor armature MA if the armature MA is energized and the polarity of the motor field MF is reversed. Also no electro-mechanical devices are required to brake the electrode motor and a very low power signal is used to effect this reversal. It is to be further noted that if at the same time the motor armature energization is turned off and the motor field polarity is also reversed, a reverse polarity voltage in the armature will be generated which is shorted through free wheeling diode D103 and dynamic braking of the motor M will result.

SENSING CIRCUITS

The secondary of transformer T301 supplies a 24 volt AC signal. This voltage is applied to the electrode-ground leads 10, 11 through resistor R315 only when the diode portion of an optical coupled isolator OCI302 is actuated. R315 limits the voltage applied to leads 10, 11 to approximately 15 volts. When the light source of OCI302 is not actuated, no current can pass through the full wave bridge formed by diodes D306, D307, D308 and D309. However, when current passes through the light source of OCI302, this turns on the photo SCR portion of OCI302 and current is allowed to pass through the full wave diode bridge and 15 volts of AC is applied to leads 10, 11. It is to be noted that the only time the sensing voltage is applied between the electrode E and workpiece W is when the inch down switch IDS is actuated.

The output of the above circuit is also rectified by a full wave rectifier bridge formed by diodes D301, D302, D303 and D304 and filtered by capacitor C301. This voltage causes current to pass through the light source of optical coupled isolator OCI301 which in turn turns on its photo transistor portion which in turn causes transistor Q303 to turn on. When Q303 is on, voltage threshold signal VTS goes on.

When the electrode E contacts the work, it creates a short circuit across leads 10, 11 with resistor R315 limiting the current through the secondary of T301. This short reduces the voltage across capacitor C301 to zero which eliminates the current through the light source of OCI301. Instantaneously the photo transistor portion of OCI301 is turned off, Q303 in turn is turned off and the voltage threshold signal VTS goes off.

MOTOR SPEED CONTROL

The arc voltage is normally in the range between 20 and 50 volts, that is to say somewhat higher than the sensing voltage applied between the electrode and workpiece when the inch down switch IDS is actuated. When the arc is established and the voltage is in this range, the relaxation oscillator formed by unijunction transistor QU301, resistor R302, resistor R308 and the capacitor C302 starts to oscillate and apply voltage pulses to the primary of pulse transformer PT301. The base two voltage of QU301 is clamped by zener diode DZ302 but the emitter voltage is proportional to the arc voltage. Hence, the oscillation frequency is higher for higher arc voltages and lower for lower arc voltages. Each voltage pulse at the secondary of PT301 turns on transistor Q302. When Q302 is turned on, voltage is applied to capacitor C306. The voltage across C306 is therefore directly proportional to the oscillation frequency of QU301 which is in turn proportional to the arc voltage. This voltage across C306 is fed to the motor control MC as an arc sensing signal ASS. The higher the voltage of this arc sensing signal ASS, the faster the motor M will run. Hence, when the arc voltage increases caused by a lengthening of the arc, the wire feed speed will increase to shorten the arc and vice versa.

COLD STARTS

When the inch down button IDS is pressed, a current flows through the light source of OCI302. This turns on OCI302 and a low signal voltage from T301, less than the minimum arc voltage, appears across 10 and 11. T301 also supplies a voltage through D301, D302, D303, D304 to QU301 and to OCI301 light source. QU301 can now oscillate and the pulse transformer PT301 transmits the pulses to transistor Q302 which oscillates and charges C306. The voltage of C306 is always at 5 volts even when QU301 does not oscillate due to the voltage bias applied by R317 and D311 as hereinafter will be described. Transistor Q303 is turned on by OCI301 and a voltage threshold signal (VTS) is sent to the logic circuit.

From the logic circuit a motor run signal (MRS) is sent to the motor control circuit. Also a motor direction signal (MDS) is sent to the electrode feed motor field supply circuit. Transistors Q106 and Q108 are turned on and Q107 is turned off. Thus PT104 is energized and SCR101 is fired. A voltage is then applied to the field circuit of such a polarity to cause the electrode to be fed toward the work.

When the electrode touches the workpiece, the low signal voltage across 10 and 11 is shorted out. OCI301 light source is thereby turned off which instantaneously turns off OCI301 transistor section, turning off Q303.

When Q303 turns off, signal VTS is turned off signaling the logic circuit LC to simultaneously turn off MDS and MRS. The turning off of the MDS signal to the motor field circuit turns off Q106 and Q108 and turns on Q107. PT105 fires, turning on SCR102 and the motor field is reversed. The turning off of the MRS signal to the motor control causes the armature voltage to be removed from the motor. This sudden field reversal with the simultaneous de-energization of the armature dynamically brakes the motor to a stop so that the electrode is lightly touching the workpiece.

When the start button STS is pressed, the logic circuit LC sends a signal PSV to energize the power source and simultaneously sends a motor run signal MRS to the motor control MC which applies power to the armature of the feed motor M. Since MDS signal is off, the motor field has a polarity which causes the electrode to be pulled away from the work. The arc is now initiated.

When the arc is well established and the arc voltage is sufficiently high, OCI301 light source and QU301 are turned on by the arc voltage sensed at 10 and 11. The activation of OCI301 and QU301 turns on the voltage threshold signal (VTS) to the logic circuit in the same manner as when they are activated from transformer T301 during inching. The logic circuit sends signal MDS to the motor field circuit which changes the field polarity as previously described causing the motor feed direction to change from backing away from the workpiece to advancing toward it.

Once the welding current is sufficiently high, the current actuated switch (CAS) causes a weld current sensing signal (WSV) to be sent to the logic circuit and to Q301. The logic circuit then signals the motor control circuit through the inch-weld control signal (IWS) to switch the armature sensing signal (ASS) into the motor armature control circuitry. The WSV turns off Q301 removing the zener clamp DZ301 which permits the voltage across C306 to fully fluctuate as dictated by the arc voltage. The armature sensing signal is proportional to the arc voltage. The higher the voltage of the arc sensing signal ASS, the faster the motor M will run.

HOT STARTS

To feed the electrode when hot starting, the start button STS is pressed sending signal (STV) to the logic circuit. Logic circuit LC sends signal (PSV) to actuate the welder power source contactor. An open circuit voltage of 65–95 volts depending the type of power source then appears across 10 and 11. This voltage activates OCI301 and QU301 which turns on the voltage threshold signal (VTS) to the logic circuit in the same manner as when they are activated from transformer T301 during "cold start" inching down. Simultaneously the logic circuit sends a motor run signal MRS to the motor control which applies power to the armature MA of the feed motor. This power is preset by a separate manual control in the motor control MC (not shown) to a value determined by experiment to drive the electrode toward the workpiece at a speed for best starting characteristics. This speed is almost always less than the speed during welding. The VTS signal to the logic circuit turns on the MDS signal to the motor field circuitry causing the motor field to have a polarity which feeds the electrode toward the work.

When the electrode touches the workpiece, the open circuit voltage across 10 and 11 is shorted. OCI301 light source is thereby turned off which instantaneously turns off OCI301 transistor turning off Q303. When Q303 turns off, signal VTS is turned off signaling the logic circuit to turn off MDS.

If the electrode touches the workpiece for a long enough time, the motor field polarity will be reversed such that the electrode will back away from the workpiece establishing the arc. Once the arc is established, the motor field polarity will then be again reversed and the electrode will be advanced toward the workpiece as previously described for cold starting.

If the electrode does not touch the work for a long enough time to reverse the motor field polarity before the arc is established, the electrode will continue to advance toward the work.

Once there is current in the power leads, the current activated switch CAS (which is associated with these power leads) closes and the welding then continues as above described.

Zener clamp DZ301 is required to obtain excellent hot starts. In particular when CAS closes, the logic circuit sends signal IWS to the motor control to shift from the manual preset speed to an arc voltage controlled speed. However, zener clamp DZ301 is required to limit this initial speed. Thus, zener diode DZ301 and transistor Q301 form a circuit such that when Q301 is on, the voltage to which C306 can be charged is limited by DZ301. Conduction of Q301 is controlled by the weld sensing voltage WSV applied through diode D305 and resistor R301 such that Q301 is normally on. By limiting the C306 voltage, the maximum speed at which the electrode will be fed toward the workpiece when CAS closes will be limited. If C306 were permitted to be fully charged at this instant, when the arc did strike, it would take too long for C306 to discharge to the normal welding level and poor starting would result.

Once CAS closes the voltage on C306 can fluctuate up and down as dictated by the ARC voltage thus providing arc stabilization during welding.

Resistor R317 provides a voltage bias through diode D311 on C306 even when QU301 does not oscillate and allows the electrode E to be inched down with a very low external impedance across leads 10, 11 but this voltage bias taken out of the circuit through diode D312 by the operation of current actuated switch CAS when welding current is established.

It will be appreciated that various capacitors may be used throughout across the various components for the purpose of reducing the effect of transients or high frequency energy which might find its way into the control circuit. These are not shown for the purposes of simplicity. It is believed that their use in appropriate places is well within the abilities of those skilled in the art of solid state circuitry.

Throughout the description and in the claims, a signal may be stated as being on (or off) which then upon the actuation of some switch or other function, goes off (or on). It will be appreciated that these signals normally have either one of two conditions, either on or off and by appropriate rearrangement of the circuit where a signal is normally on, it would be just as easy to have the signal off and produce the same result.

It is believed that the invention and that part of the circuitry which accomplishes the invention, have been described in such full, clear, concise and exact terms, as to enable any person skilled in the art of solid state circuitry, to make and use the same.

However to assist in such understanding, the various components referred to in the specification and shown in the drawings have the following electrical values:

| | | | |
|---|---|---|---|
| R101 | 40 | R301 | 47 K |
| | | R302 | 4.7 K |
| R119 | 6.8 K | R303 | 6.8 K |
| R120 | 680 | | |
| R125 | 2.7 K | R306 | 4.7 K |
| R126 | 2.7 K | R307 | 100 |
| R127 | 4.7 K | R308 | 10 K Variable |
| R128 | 47 K | R309 | 15 |
| R129 | 47 K | | |
| | | R312 | 6.8 K |
| R214 | 1.5 K | R313 | 6.8 K |
| | | R314 | 47 K |
| | | R316 | 470 K |
| | | R317 | 10 K |
| C102 | 50MFD | C301 | 2MFD |
| | | C302 | .1MFD |
| C116 | .047MFD | C306 | 2MFD |
| | | C308 | .22MFD |
| D103 | 16A | D301 through D304 1A avalanche | |
| | | DZ301 | 5.1 V. |
| | | DZ302 | 10 V. |
| | | DZ303 | 25 V. |
| Q106, | 107, 108 2N 4123 | Q301 | 2N 4123 |
| | | Q302 | 2N 4125 |
| | | Q303 | MPS A13 |
| | | QU101, | QU301 D5E 43 |
| SCR101, | SCR102 8 Amp. 600 V. | | |
| OCI301 | 4N 28 | | |
| OCI302 | MCS2 | | |

Having described our invention, we claim:

1. An automatic electric arc welder comprising in combination:
    a. an electric motor having a field and armature for moving an arc welding electrode towards and away from a workpiece,
    b. means for energizing said armature with a unidirectional voltage when it is desired that said armature rotate,
    c. means for continuously energizing said field with a reversible polarity voltage whereby said armature when energized will rotate in either an electrode retract or electrode feed direction,
    d. braking means consisting of a diode connected directly in parallel with said armature of a polarity as to be 'off' whenever said armature is energized with said unidirectional polarity voltage and 'on' whenever said armature generates a voltage of opposite polarity whereby when said armature is de-energized and the polarity of said field voltage is reversed from a feed direction to a retract direction said armature is automatically dynamically braked.

2. A cold start circuit for the electrode feed motor of an electric arc welder which moves an electrode relative to a workpiece, said feed motor having an armature and a field, comprising in combination:
    a. means providing a sensing voltage between said electrode and a workpiece,
    b. means for energizing said armature with a unidirectional polarity voltage,
    c. means for continuously energizing said field with a reversible polarity voltage whereby said motor armature when energized will rotate in either an electrode retract or electrode feed direction,
    d. an inch down switch which when operated actuates said armature and field energizing means to cause said motor armature to rotate in an electrode feed direction,
    e. means responsive to said electrode contacting said workpiece and shorting said sensing voltage for actuating said energizing means to de-energize said motor armature and reverse the polarity of said field voltage from a feed direction to a retract direction,
    f. braking means consisting of a diode connected directly across said armature and polarized to be 'off' when said armature is energized with said unidirectional polarity voltage and 'on' whenever said armature generates a voltage of opposite polarity whereby when said electrode contacts said workpiece said motor is substantially instantly dynamically braked when both said field polarity is reversed from a feed to a retract direction and said armature is de-energized.

3. The control circuit of claim 2 wherein a start switch is provided, means responsive to the actuation of said start switch to energize said motor armature and a welding power source whereby said motor rotates to move said electrode away from said workpiece and strike an arc and means responsive when an arc voltage exists between said electrode and said workpiece to reverse the polarity of said motor field so that said motor drives said electrode towards said workpiece.

4. A hot start control circuit for an electric arc welder comprised of:
    a. an arc welding power source having a drooping volt-ampere curve and an electric motor having a field and armature arranged to drive an electrode energized from said source towards a workpiece to be welded,
    b. means energizing said motor field with a reversible polarity voltage of a predetermined value,
    c. controllable means energizing said armature with a uni-directional voltage,
    d. a start switch which when actuated actuates said armature energizing means to supply said armature with a pre-set voltage which moves said electrode toward the workpiece at a speed less than that during welding, e. means for generating a signal voltage proportional to said electrode workpiece voltage, said electrode workpiece voltage changing from the open circuit voltage of said power source to approximately zero when said electrode first touches said workpiece, to an intermediate voltage proportional to the rate of electrode feed after the arc is established, said signal voltage controlling the output voltage of said armature energizing means during welding, f. means for reversing the motor field polarity when said electrode workpiece voltage goes to zero, g. means when said electrode first contacts said workpiece for changing said armature energizing means from supplying said armature with a pre-set voltage to a voltage proportional to said signal voltage, h. means limiting said signal voltage to a predetermined value before said electrode contacts said workpiece whereby to delay the increase in speed of said armature until said arc is established, i. means removing said limiting means after said arc is established whereby the electrode will be fed toward the workpiece at a rate to maintain a generally constant arc voltage.

5. The circuit of claim 4, wherein said signal voltage is developed across a capacitor.

* * * * *